United States Patent [19]
Stewart

[11] 3,785,378
[45] Jan. 15, 1974

[54] FLOW CONTROL VALVE FOR INTRAVENOUS FLUIDS

[76] Inventor: Calvin R. Stewart, 471 W. Duarte Rd., Apt. 226, Arcadia, Calif. 91006

[22] Filed: Apr. 6, 1972

[21] Appl. No.: 241,712

[52] U.S. Cl............... 128/214 C, 251/125, 251/207
[51] Int. Cl............................................. A61m 5/16
[58] Field of Search................... 128/214 R, 214 C, 128/214.2; 251/125, 207–209

[56]  References Cited
UNITED STATES PATENTS

| | | | |
|---|---|---|---|
| 3,323,774 | 6/1967 | Wilson | 251/125 |
| 2,771,878 | 11/1956 | Folland et al. | 128/214 R |
| 2,701,704 | 2/1955 | Lawrence | 251/207 X |
| 2,455,625 | 12/1948 | Trantin | 251/207 |

Primary Examiner—Dalton L. Truluck
Attorney—William W. Haefliger et al.

[57]  ABSTRACT

A valve operable with means to administer fluid intravenously comprises:

a. an annular member forming a central passage through which fluid is flowable and having an end face with multiple grooves therein, the grooves having inner ends communicating with said passage and being generally circularly spaced, the grooves extending outwardly relative to said passage and having different cross sectional areas, and b. a flow control member having an end face relatively rotatable adjacent said annular member end face, the control member having a flow port successively and selectively communicating with said grooves in response to said relative rotation, said port adapted to pass fluid to administration tubing.

8 Claims, 7 Drawing Figures

PATENTED JAN 15 1974
3,785,378
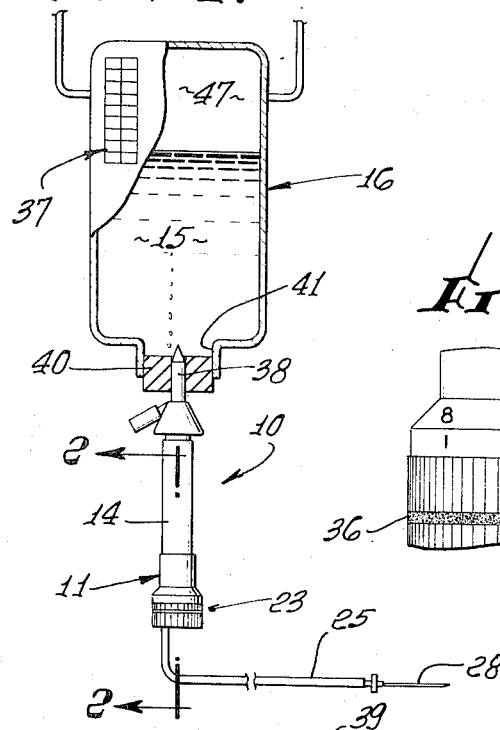
FIG. 1.
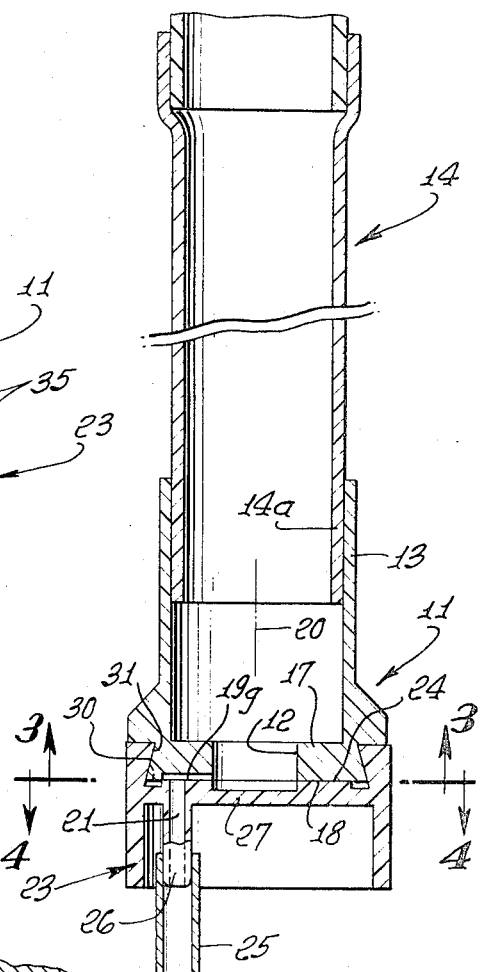
FIG. 2.
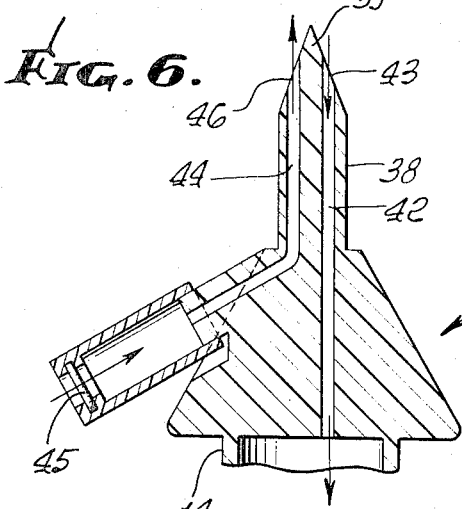
FIG. 5.
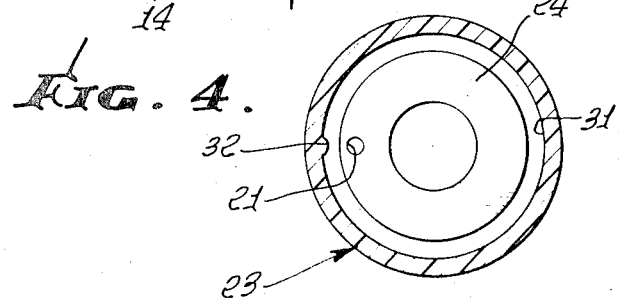
FIG. 6.
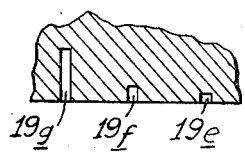
FIG. 7.
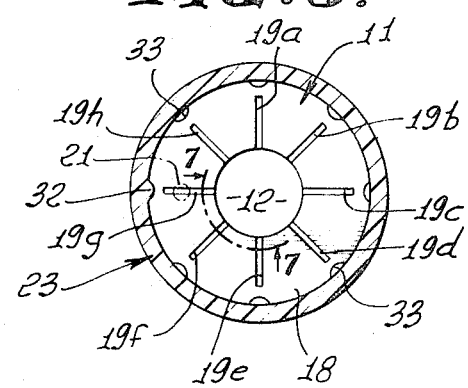
FIG. 4.
FIG. 3.

FLOW CONTROL VALVE FOR INTRAVENOUS FLUIDS

BACKGROUND OF THE INVENTION

This invention relates generally to apparatus used for intravenous fluid administration to patients. More particularly, it concerns improvements in valved regulation of intravenous fluid flow to an administration tip.

In the past, such fluids were supplied to patients via tubing to which an adjustable clamp was applied. The attendant adjusted the clamping of the tubing in an attempt to achieve the desired flow rate in terms of drops per minute supplied from the tip. This procedure was fraught with problems having to do with unpredictable or uncontrollable variances in drip rates, for example due to incorrect timing estimates of drips per minute, and the danger of incorrect administrations particularly in emergencies where little time is available in which to time the drip rate and corrspondingly adjust the clamp.

Various expedients have been resorted to in an effort to correct these problems. For example, flow regulating devices have been constructed in which a flow port is adjusted along a variable width groove to which fluid is supplied, however, no positive, predetermined drip rate can be secured without timing of the drops, due to the continuously changing flow rate which varies with port adjustment along the groove. In addition, the drip rates varies with viscosity of the fluid involved, and initial flushing of air from the system becomes a problem due to the inability of the variable grooves to pass fluid at sufficiently high flow rates.

SUMMARY OF THE INVENTION

It is a major object of the invention to provide apparatus characterized as eliminating the above and other problems previously endemic to intravenous fluid administration apparatus.

Basically, the invention is embodied in a valve that comprises:

a. an annular member forming a central passage through which intravenous fluid is flowable and having an end face with multiple grooves therein, the grooves having inner end or entrance communication with the passage and being generally circularly spaced, the grooves extending outwardly relative to the passage and having different cross sectional areas; and, a flow control member having an end face relatively rotatable adjacent the annular member end face, the control member having a flow port successively and selectively communicating with the grooves in response to such relative rotation, the port adapted to pass fluid to tubing for administration to a patient. As will be seen, the widths of the majority of the grooves may advantageously be the same so as to similarly cooperate with the flow port in registration therewith, and the depths of different grooves may vary to establish different flow rates, the depth of each groove remaining substantially the same, lengthwise of that groove. Accordingly, a series of positive and predeterminable flow rates is established for a given fluid, eliminating timing guesswork as formerly was involved in the use of prior devices, as well as dangerous inaccuracies in flow rate determinations which led to possible health hazards.

The invention also makes possible the employment of color or other coding on the apparatus to indicate the composition of fluid to be controllably passed through the chamber and valve at the predetermined or precalibrated flow rates for drip-administration, intravenously, to a patient.

A further object and feature of the invention concerns the provision of structure enabling fast or steady flow-through of fluid to remove air entrapped in the apparatus including tubing attached to the rotary member. For this purpose, one of the grooves may have a cross sectional area several times greater than the areas of the other grooves.

Additional objects and advantages include the provision of detent means to relasably retain the members in relative rotary positions corresponding to port registration with the grooves; and the provision for upward air flow to the supply bottle via the same stream through which fluid from the bottle flows downwardly to the relatively rotatable members as described.

These and other objects and advantages of the invention, as well as the details of an illustrative embodiment, will be more fully understood from the following description and drawings, in which:

DRAWING DESCRIPTION

FIG. 1 is an elevation showing use of the invention;

FIG. 2 is an enlarged vertical elevation taken on lines 2—2 of FIG. 1;

FIG. 3 is an enlarged end view of the annular member which is grooved;

FIG. 4 is an enlarged end view of the flow control member;

FIG. 5 is an enlarged fragmentary elevation of the annular and flow control members showing one form of calibration;

FIG. 6 is an enlarged fragmentary view of the stem connection to penetrate a supply bottle stopper, and FIG. 7 is an enlargd section taken on lines 7—7 of FIG. 3.

DETAILED DESCRIPTION

An example of a valve incorporating the invention is seen at 10 in the drawings, and as including an annular member 11 forming a central passage 12 through which intravenous fluid is downwardly flowable. Member 11 may be formed to have a skirt 13 telescopically receiving the lower end portion 14a of a cylindrical chamber 14. Fluid 15 is gravity supplied to the latter from a supply bottle 16, in a manner to be described.

Member 11 has a bottom wall 17 with an end face 18 in which multiple grooves $19a \ldots 19h$ are formed or sunk. The grooves have inner ends which directly communicate with central passage 12, and which are circularly spaced about passage 12 and its axis 20. Further, the grooves extend generally outwardly (as for example radially) relative to passage 12, and have different flow passing cross sectional areas. As will appear, the widths of the majority, or all, of the grooves may be the same so as to cooperate similarly with a flow port 21 (to be described) in successive and selective registration therewith, thereby to contribute to the desired predeterminable flow rate functioning of the valve; on the other hand, the groove depths may differ, and in particular the depth of each groove may remain the same along its lengths, whereby a series of different flow rates may be established in correspondence to the positioning of the port 21 thereover. The fact that the flow lengths through the various grooves to port 21 are equal also contributes to desired flow rate predictability and accuracy, reducing the risk of inaccurate fluid drip-rate administration to a patient.

The valve 10 also includes a flow control member 23 in the form of a cap extending completely across the bottom wall 17 of member 11, in sealing relation therewith. The cap has an interior end face 24 which is relatively rotatable, with the cap, adjacent the end face 18 of member 11. The member 23 also defines the above referenced flow port 21 which successively and selectively communicates or registers with the grooves 19a . . . 19h in response to such relative rotation. Accordingly, fluid flows via port 20 to administration tubing 25 suitably telescopically (or otherwise) coupled to a nipple 26 extending below and from the cap wall 27. The lower end of flexible plastic tube 25 may terminate at a needle or tip 28 sized for intravenous reception. Both members 11 and 23 may consist of suitable molded plastic material, such as polystyrene or other resin.

One of the grooves may advantageously have a cross sectional area at least several times greater than the cross sectional areas of others of the grooves, in order to pass fluid at an "air-flushing" rate, i.e., steadily, from the tip 28. For this purpose, the selected groove, as for example at 19g' may have a depth several times greater than the depths of the other grooves. Merely by way of example, the widths of all grooves may be about 0.0001 inch; the depths of the drip rate control grooves may vary between 0.002 and 0.008 inches; and the depth of the "air-flush" groove may be about 0.035 to 0.045 inch. This eliminates need for loosening a clamp on the tubing 25 in order to achieve the increased flow rate sufficient to remove air from the system.

It will be noted that the wall 17 of member 11 may protrude as shown, with an annular peripheral undercut at 30, to retain the "dove-tail" interfitting annular shoulder 31 defined by the member 23. This construction serves to retain the members 11 and 23 in closely intercoupled relation to seal off between faces 18 and 24 about the passage 12, and between the grooves, while allowing relative rotation of these members as afforded by the bearing defined at 30 and 31. Detent means may be provided to releasably retain the members in relative rotary positions corresponding to selective registration of port 21 with the grooves 19a . . . 19h. One such detent means is defined by the convex lug 32 protruding radially inwardly from a portion of the shoulder 31 to successively engage the concave notches 33 sunk in the undercut periphery 30 of wall 17. A marker 34 on the outer surface of member 23 selectively registers with indicia 35 on the outer surface of member 11, to indicate selected and predetermined drip rates for a selected fluid.

The valve lends itself to coding, as for example color coding, one form of which may consist of a colored band 36 on member 23. For example, one color band 36 may indicate that when the valve is used with a similarly color coded bottle 16 containing fluid A, certain predetermined drip rates being achieved for selected settings of arrow 34 relative to indicia 35, as represented on a chart 37 on the one bottle; and another color band 36 may indicate that when the valve is used with a similarly color coded bottle containing fluid B, certain other predetermined drip rates being achieved for selected arrow settings, as represented on a chart 37 on that other bottle. Therefore, the user may quickly select the needed color coded valve and bottle and set up the apparatus with a quickly and accurately determined and selected fluid drip rate. Two typical fluids are saline and dextrose solutions, others, of course, being usable.

FIG. 6 shows that chamber 14 may have an integral stem 38 projecting upwardly therefrom, with a tapered tip 39 to penetrate a plug or stopper 40 closing the neck 41 of the bottle 16. Duct 42 in the stem extends from entrance 43 downwardly to the chamber interior, to drain fluid to that chamber 14 for filling same. Duct 44 extends from a check valve 45 upwardly in the stem to exit at location 46 sidewardly of the tip 39. Replacement air is admitted, as required, via the check valve to flow upwardly in the duct 44 and into the upper interior 47 of the bottle. Valve 45 may be of flapper type to block outward flow of fluid.

I claim:

1. A valve operable with means to administer fluid intravenously, comprising
   a. an axially extending upper non-rotary annular member forming a central passage through which fluid is flowable and having an end face with multiple grooves therein, the grooves having inner ends communicating with said passage and being generally circularly spaced, the grooves extending outwardly relative to said passage and having different cross sectional areas, and
   b. a rotary flow control member having an end face relatively rotatable adjacent and directly beneath said annular member end face, the control member having a flow port successively and selectively communicating with said grooves in radially outwardly spaced relation to said passage and in response to said relative rotation, said port adapted to pass fluid to administration tubing,
   c. a flow control chamber connected with said annular chamber to supply fluid simultaneously to said grooves via said central passage, and
   d. each groove having width and depth dimensions, the width dimensions being the same at all the grooves in planes normal to said axis, and the depth dimensions being different for the different grooves, and
   e. said grooves including an air-flush groove the depth dimension of which is at least several times greater than the largest of the depth dimensions for the remaining grooves.

2. The valve of claim 1 wherein the depth dimension of said air-flush groove is about 0.035 to 0.045 inch, and the depth dimensions of said remaining grooves vary from about 0.002 to about 0.008 inches.

3. The valve of claim 1 including said tubing attached to said flow control member, the tubing being flexible and free of flow regulating clamp attachment.

4. The valve of claim 1 including detent means to releasably retain the members in relative rotary positions corresponding to port registration with said grooves.

5. The valve and chamber of claim 1 in which a stem projects from the chamber endwise oppositely from the annular member, the stem containing a first passage for fluid entering the chamber and a second passage for air entering a fluid supply bottle.

6. The valve and chamber of claim 1 having color coding on at least a surface portion thereof to indicate the composition of fluid to be controllably passed through the chamber and valve for administration to a patient, the chamber located generally above the annular member and the flow control member located generally below the annular member.

7. The valve and chamber of claim 1 wherein said members have rotary and sealing interconnection.

8. The valve of claim 1 wherein the depth of each groove remains substantially uniform lengthwise of the groove.

* * * * *